(12) United States Patent
Yu et al.

(10) Patent No.: US 7,791,036 B2
(45) Date of Patent: Sep. 7, 2010

(54) X-RAY LINE ARRAY DETECTOR

(76) Inventors: Honglin Yu, The 15 Building of 15 Area, No. 188 West Road of South 4 Loop Road, Fengtai District, Beijing (CN) 100070; Zhengyu Jin, The 15 Building of 15 Area, No. 188 West Road of South 4 Loop Road, Fengtai District, Beijing (CN) 100070; Kuncheng Li, The 15 Building of 15 Area, No. 188 West Road of South 4 Loop Road, Fengtai District, Beijing (CN) 100070; Xiaowei Sun, The 15 Building of 15 Area, No. 188 West Road of South 4 Loop Road, Fengtai District, Beijing (CN) 100070; Gendi Jiang, The 15 Building of 15 Area, No. 188 West Road of South 4 Loop Road, Fengtai District, Beijing (CN) 100070

( * ) Notice: Subject to any disclaimer, the term of this patent is extended or adjusted under 35 U.S.C. 154(b) by 83 days.

(21) Appl. No.: 12/062,973

(22) Filed: Apr. 4, 2008

(65) Prior Publication Data

US 2009/0095913 A1    Apr. 16, 2009

(30) Foreign Application Priority Data

Apr. 6, 2007    (CN)    ......................... 2007 1 0090840

(51) Int. Cl.
*G01T 1/24*    (2006.01)

(52) U.S. Cl. ............................................. 250/370.11

(58) Field of Classification Search ............. 250/370.11
See application file for complete search history.

(56) References Cited

U.S. PATENT DOCUMENTS

| 5,150,394 | A | * | 9/1992 | Karellas | ...................... 378/62 |
| 6,627,896 | B1 | * | 9/2003 | Hashimoto et al. | ..... 250/370.11 |
| 2008/0031418 | A1 | * | 2/2008 | Tseng | ....................... 378/98.3 |

* cited by examiner

*Primary Examiner*—David P Porta
*Assistant Examiner*—Shun Lee
(74) *Attorney, Agent, or Firm*—Harness, Dickey & Pierce, P.L.C.

(57) ABSTRACT

The present invention relates to an X-ray line array detector in which a bundle of light-guide fibers is provided between an emergent surface of a scintillator and an incident surface of an array of photosensors, and the bundle of light-guide fibers has at least one bend, or an incident direction and an emergent direction are not in a same line, so that X-rays transmitting through the scintillator can not irradiate photosensors and integrated circuits behind them, and that damage resulting from long-term use or a large dose of X-ray radiation can be avoided, thereby prolonging lifetime of the line array detector. Further, a shielding body provided between the emergent surface of the scintillator and the incident surface of the array of photosensors can further shield the photosensors and their integrated circuits from interference of X-rays, so that good protection of the photosensors and their integrated circuits is achieved, thereby enhancing greatly anti-radiation performance of the detector and doubling the lifetime.

5 Claims, 3 Drawing Sheets

X-RAY LINE ARRAY DETECTOR

FIELD OF THE INVENTION

The present invention relates to an X-ray line array detector.

BACKGROUND OF THE INVENTION

The principle for a line array detector to line scan and acquire an image is that an X-ray source is driven by a mechanical scanning device to move in phase with the detector to perform X-ray scan on a person or object to be detected. Each time the mechanical scanning device moves by a unit distance (e.g., 0.2 mm), the detector acquires a line of X-ray image data. If the mechanical scanning device moves by a distance of 40 cm successively and uniformly, the detector acquires 2000 lines of X-ray image data accordingly. The data are processed by a computer to form a frame of an X-ray image of approximately 40 cm×40 cm for the object which is mechanically scanned.

An existing line array detector is structured as illustrated in FIG. 1, and comprises an X-ray probe, a signal acquisition circuit, and a low voltage power source combination. Wherein, the X-ray probe and the signal acquisition circuit are packed together in a cuboid aluminum alloy box, and the low voltage power source combination (not shown) is packet separately in a metal square box with good heat dissipation character. Wherein, the X-ray probe includes four parts of a collimator 101, a scintillator 102, an array of photosensors 103, and a shift amplifier 104. The signal acquisition circuit 100 includes an analog signal processor 105, an analog/digital converter (A/D converter) 106, and an interface circuit 107. A physical process of acquiring a line of X-ray signals includes: projecting X-rays onto the collimator 101 of the detector through the person (object) to be detected and collimated X-rays arriving at the scintillator 102; the scintillator 102 converting X-rays into visible light which are then received and converted by the photosensors 103 into electric signals; acquiring the electric signals by the back-end signal acquisition circuit 100; converting the electric signals into digital signals sequentially through the analog signal processor and preamplifier 105 and the A/D converter 106; storing the digital signals into a buffer; transmitting the image data stored in the buffer to a computer via the communication interface circuit 107; upon receiving sufficient lines of X-ray image information, the computer performing data reconstruction on the image data to form integral image data and storing the image data in a hard disk.

In an existing line array detector, due to the compact integral incorporation of the scintillator 102, the array of photosensors 103, and the shift amplifier 104, such a structure has a significant drawback in that X-rays transmitting through the scintillator directly irradiate the photosensors 103 and integrated circuit behind them, and thus cause etch damage to the integrated circuits. Therefore, the photosensors and the integrated circuits behind them tend to be damaged after a period of use or upon irradiated by a large dose of X-rays.

SUMMARY OF THE INVENTION

The present invention addresses the above drawback by providing an X-ray line array detector with long lifetime and high image sensitivity.

A solution through which the invention addresses the technical problem is an X-ray line array detector including an X-ray probe. The X-ray probe includes a scintillator and an array of photosensors, wherein a bundle of light-guide fibers is provided between an emergent surface of the scintillator and an incident surface of the array of photosensors. The bundle of light-guide fibers has at least one bend or the incidence direction and the emergence direction are not in a same line.

The bundle of light-guide fibers may be U shaped.

At least one of the incident surface and an emergent surface of the bundle of light-guide fibers may be a bevel.

An angle between the bevel and a direction of the bundle of light-guide fibers may be less than 45 degrees.

A shielding body may be provided between the emergent surface of the scintillator and the incident surface of the array of photosensors.

The shielding body may be made of a metal material.

The array of photosensors may be consisted of a single line array or multiple lines array photosensors.

The array of photosensors may be consisted of photoelectric couplers or amorphous silicon photodiodes.

The incident surface and the emergent surface of the bundle of light-guide fibers may be bonded respectively with the emergent surface of the scintillator and the incident surface of the array of photosensors through a coupling agent.

The U-shaped bundle of light-guide fibers may be produced through winding light-guide fibers around the shielding body in layers and splitting the light-guide fibers and the shielding body along a winding direction of the light-guide fibers The light-guide fibers are bonded with each other and with the shielding body via composite glue.

According to the invention, the bundle of light-guide fibers is provided between the emergent surface of the scintillator and the incident surface of the array of photosensors, and the bundle of light-guide fibers has at least one bend or the incident direction and the emergent direction are not in a same line, so that X-rays transmitting through the scintillator can not irradiate the photosensors and integrated circuits behind them, thereby avoiding damage resulting from long-term use or a large dose of X-ray radiation, and prolonging lifetime of the line array detector. Further, the shielding body provided between the emergent surface of the scintillator and the incident surface of the array of photosensors can further shield the photosensors and their integrated circuits from interference of X-rays so that the photosensors and their integrated circuits are perfectly protected, thereby enhancing greatly anti-radiation performance of the detector and doubling its lifetime.

BRIEF DESCRIPTIONS OF THE DRAWINGS

DETAILED DESCRIPTIONS OF THE EMBODIMENTS

The First Embodiment

This embodiment is consisted of an X-ray probe, a signal acquisition circuit, and a low voltage power source combination.

Figure 1:
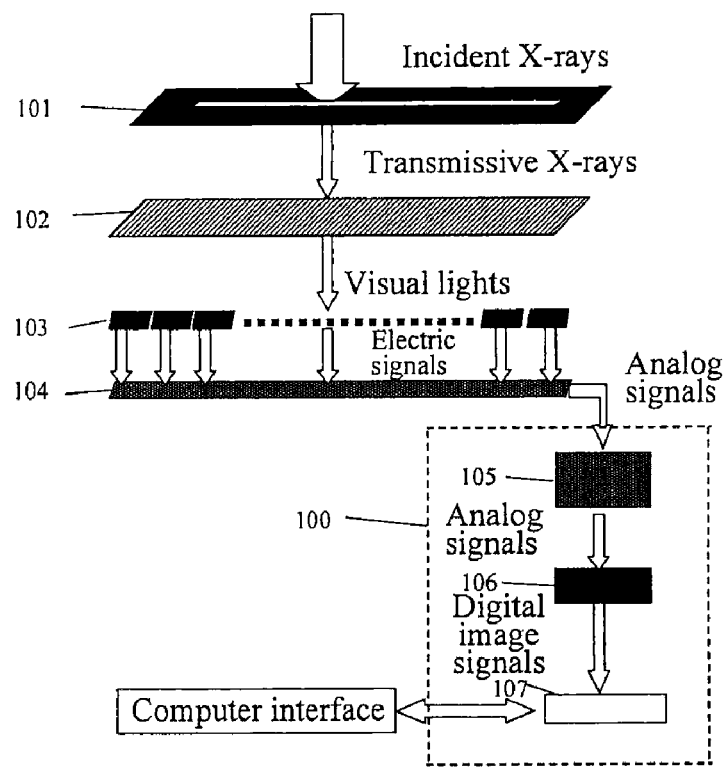
FIG. 1 is a schematic diagram of a structure of a line array detector in the prior art.
Figure 2:
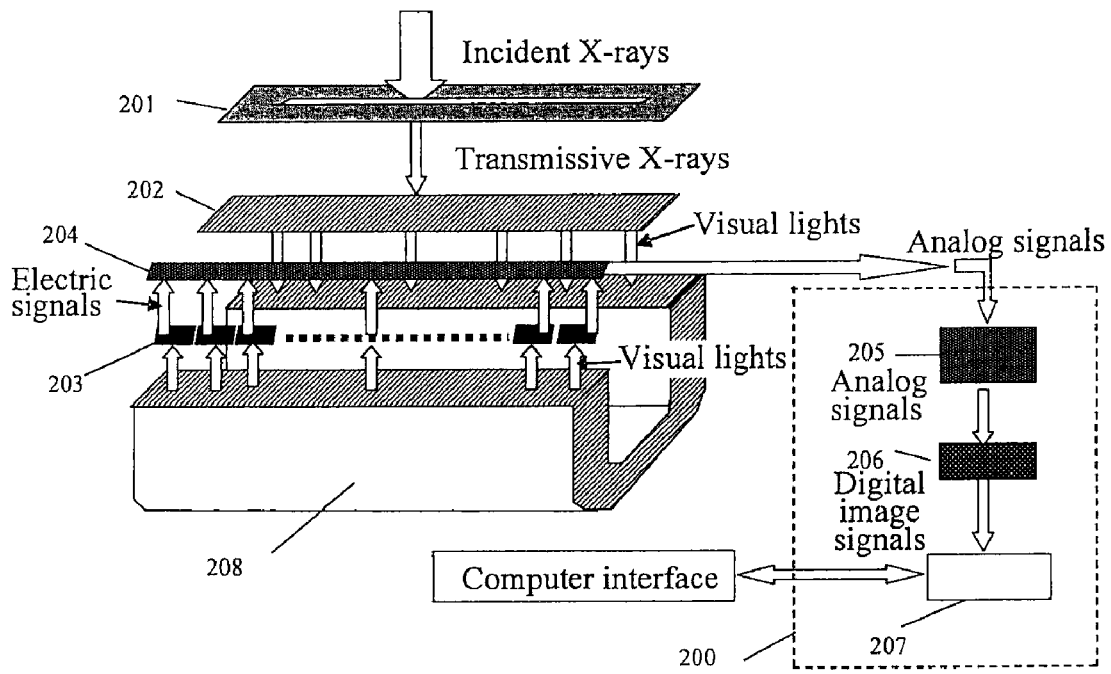
FIG. 2 is a stereoscopic view of a structure in a first embodiment of the invention.
Figure 3:
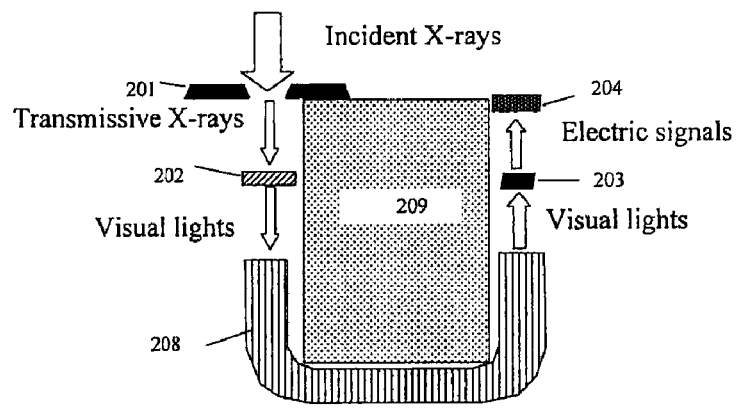
FIG. 3 is a side view of the ray probe in FIG. 2.

As illustrated in FIG. 2 and FIG. 3, the X-ray probe is a closed aluminum alloy chamber including a collimator 201, a flicker body 202, an array of photosensors 203, and a shift amplifier 204. a front panel is made of a lead antimony alloy material with shielding functions, and at its upper part, there is provided the bar collimator 201 of a 410 mm length and a 1.6 mm width. The top of the collimator is sealed with an aluminum film to serve as an incident window for X-rays, and the flicker body 202 is provided below the collimator and converts incident X-rays energy into light energy with a wavelength of 200-1000 µm. A U-shaped bundle of light-guide fibers 208 is provided between an emergent surface of the flicker body 202 and an incident surface of the array of photosensors 203, so that X-rays transmitting through the flicker body 202 do not irradiate the photosensors and their integrated circuits, thereby perfectly protecting the photosensors and prolonging lifetime of the detector. The incident and emergent surfaces of the bundle of light-guide fibers 208 are bonded respectively with the emergent surface of the flicker body and the incident surface of the array of photosensors through a coupling agent. Thus, image transmission between the emergent surface of the flicker body 202 and the incident surface of the array of photosensors 203 will not be subject to significant loss of light energy and interference of scattering lights. The coupling agent shall have sufficient chemical stability and can keep unchanged in performance for a long period, its material shall be sufficiently transparent, and its refractive index shall be between that of the light-guide fibers and that of the flicker body. Typically, silicon oil or low adhesion optical resin or the like can be selected as the material. When coating in practice, a too thin or too thick coupling agent shall be avoided, and bubbles shall be avoided too. Visual light passing through the bundle of light-guide fibers 208 is projected onto the array of photosensors 203 which converts light energy into electric signals in proportion. The array of photosensors 203 is in a length of 41 cm, and can be formed by splicing 16 segments of line arrays of 128 photosensors. Signal lead-out lines of each segment of line arrays of 128 photosensors are connected respectively with the shift amplifier 204 to perform signal reading. The read analog signals are amplified in the preamplifier 205 in the signal acquisition circuits 200, and transmitted into the A/D converting circuits 206 to be converted into digital signals which are then transmitted as image signals by a line memory interface circuit 207 to a computer.

A shielding body 209 is provided between the emergent surface of the scintillator 202 and the incident surface of the array of photosensors 203. The shielding body 209 can be of a metal such as copper, iron, aluminum and the like, and further shields the photosensors and their integrated circuits from X-ray interference, thereby perfectly protecting the photosensors and the integrated circuits internal to and behind them, and greatly enhancing anti-radiation performance of the detector and doubling its lifetime.

Figure 4:
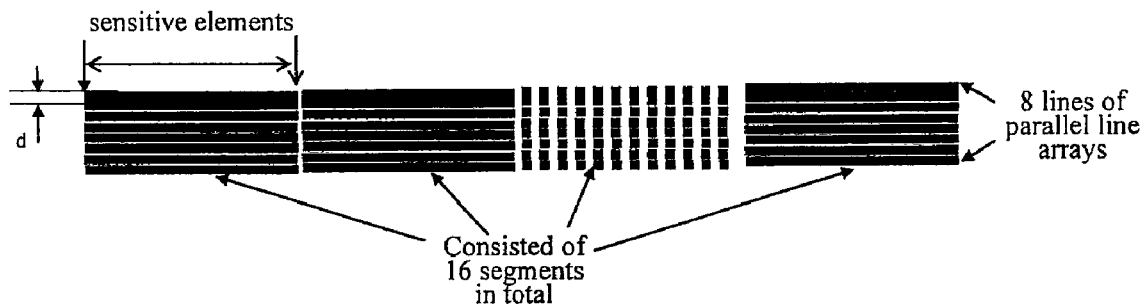
FIG. 4 is a schematic diagram of a structure of the array of photosensors.

A primary component in the probe is the array of photosensors 203 consisted of 16 segments of elements of 128 photosensors. Wherein a signal of each photosensor is deemed as a pixel of an image, a value of its gray scale is represented with two bytes, a sensitive area of each photosensor element is in a size of approximately 0.17 mm×0.17 mm, a distance between centers of any two adjacent diode elements is 0.2 mm, and accordingly, a spatial resolution of the detector is 2.5 Lp/mm. A period of time for a line of 2048 photosensor element to acquire and output data is controlled by the signal acquisition circuit and adjustable. Taking a frame of image with a size of 40 cm×40 cm and an acquisition time of 2 seconds as an example, the time for a one line array to acquire and output data is 1 ms. Accordingly, the required mechanical scanning speed shall be (0.2 mm÷1 ms=)200 mm/s. A small integration area of a single photosensor element and only 1 ms of integration time of each line result in a low count of the detector. To remedy this drawback, a combination of 8 parallel lines of such 2048 channel line array detectors can be used. That is, as illustrated in FIG. 4, image information for each point is formed from superposition of signals of sensitive photosensors in 8 line arrays at this point, and thus a detecting sensitivity of the detector is enhanced by 8 times that of a single line array, which reduces the requirement of situation for X-ray bulb tube and high voltage generator. Naturally, a signal-to-noise ratio of an image can be increased and a quality of the image can be improved. Also, the use of the combination of 8 lines of parallel 2048 channel line array detectors may increase the technical requirement for a scanning system and an image acquisition system in that the scanning speed shall precisely match data acquisition times of the detectors, and consequently the signal acquisition circuit 200 shall have an accurate and stable control on data acquisition and output time. The use of a line array detector with multiple line arrays, e.g., 8 line arrays, can overcome the drawback of low response of a single line array detector to X-rays, and can improve operation efficiency of the detector and reduce requirement on strength of an X-ray source in X-ray measurement. Further, with a single line array detector, if damage occurs to a photosensor, the damage can be mathematically treated. That is, data on both sides (or either side) of the damaged photosensor is used to obtain a specific value as measured data of the damaged photosensor. This data is an inferential value with great possibility of incorrectness. But with a multiple line array detector, if damage occurs to a detecting element, measured data of this element can be replaced with a value of a detecting element in other line arrays at the same position. This value is a really measured value, and therefore the multiple-line array detector is significant for repairing a damaged photosensor. Wherein devices used in the array of photosensors 203 can be Charge Coupled Devices (CCD), amorphous silicon photodiodes (TFD), etc.

The signal acquisition circuit 200 is also provided in the aluminum alloy box where the X-ray probe is located, and is consisted of an analog signal processor and preamplifier 205, a 16-bit A/D converter 206, and an interface circuit 207. The signal acquisition circuit 200 acquires, processes and outputs electric signals acquired by the photosensors. The analog signal processing circuit and preamplifier 205 is adapted to read signals and to integrate signals. The A/D converter 206 is adapted to convert analog signals into digital signals to be written into a line memory of an adapter. The interface circuit 207 can include three interfaces, which are respectively:

① A low voltage power supply interface to be connected with a low voltage power supply;

② An E-THERNET interface for transmitting image data to a computer through a network system;

③ An RS485 interface to be connected to an external control when necessary.

To avoid occurrence of dispersion in a flickering image transmitted through the U-shaped bundle of light-guide fibers 208 and thus an influence on quality of the image received by the photosensors, the light-guide fibers must be in buddle, and a receiving surface of a photosensor shall correspond to an end surface of one or more light-guide fibers.

Figure 5:
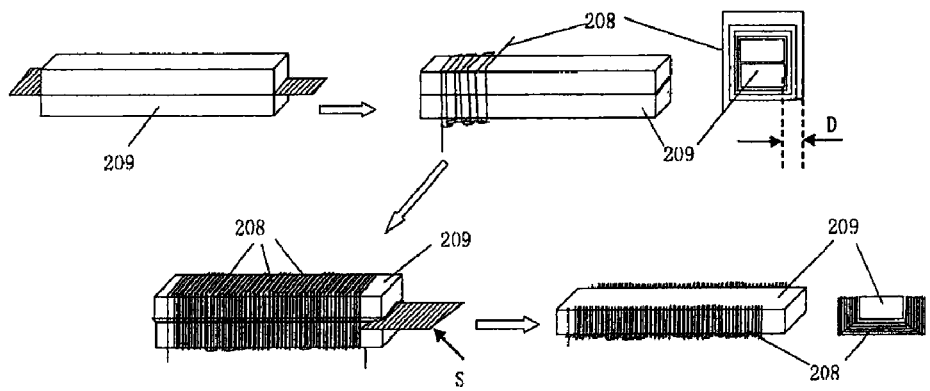
FIG. 5 is a schematic flow chart of producing a bundle of light-guide fibers in the first embodiment of the invention.

FIG. 5 illustrates a schematic flow chart of producing the U-shaped bundle of light-guide fibers 208 in the embodiment. A cuboid shaped shielding body 209 is prepared, and edges of the shielding body 209 shall be rounded to be smooth. Then, the shielding body 209 is split into two halves along a longitudinal direction of the cuboid, and the two halves are spliced corresponding to their original relative positions. Light-guide fibers are wound around the shielding body 209 to form the bundle of light-guide fibers 208. The fibers are wound as compact as possible and kept parallel with a cross section of the cuboid at most. The light-guide fibers are wound in multiple layers with a thickness D determined by the width of the scintillator 202. Composite glues are applied uniformly between the light-guide fibers and between the light-guide fibers and the shielding body 208 for bonding. After the glues dried, the bundle of light-guide fibers 208 is split along where the shielding body 209 is split, i.e., the plane S, and thus two split halves are respectively a U-shaped bundle of light-guide fibers 208. Finally, a cross section where the bundle of light-guide fibers is split is polished.

The Second Embodiment

Figure 6:
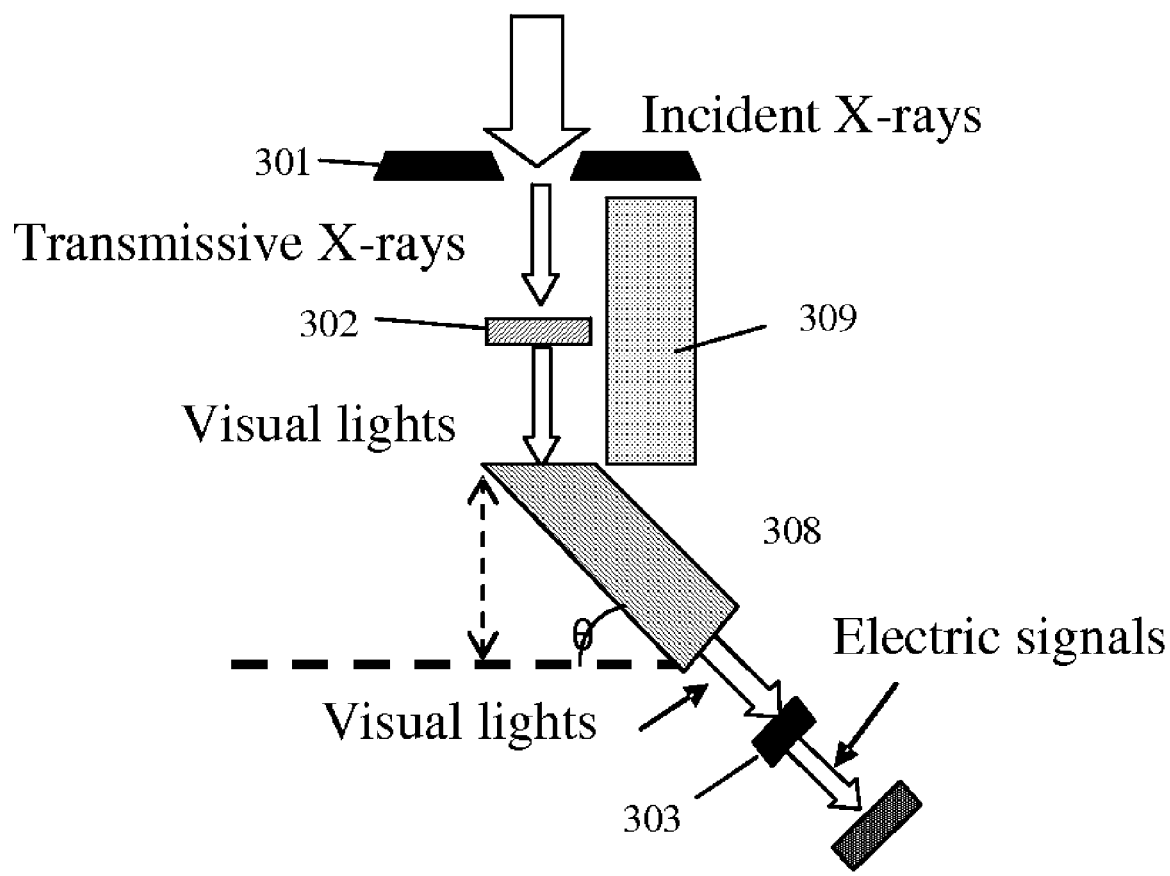
FIG. 6 is a schematic diagram of a structure in a second embodiment of the invention.

This embodiment as illustrated in FIG. 6 is structured substantially the same as the first embodiment except that the incident surface of the bundle of light-guide fibers 308 is a bevel, X-rays pass through the collimator 301 and then are converted into visual lights through the scintillator 302, and the visual lights irradiate the array of photosensors 303 at the emergent surface after passing the inclined incident surface of the bundle of light-guide fibers 308 and are converted into electric signals in proportion. Thus, X-rays transmitting through the scintillator 302 can not irradiate the photosensors and their integrated circuits, and the photosensors are perfectly protected and the lifetime prolonged. The incident and emergent surfaces of the bundle of light-guide fibers 308 are also bonded respectively with the emergent surface of the scintillator 302 and the incident surface of the array of photosensors 303 with a coupling agent. A shielding body 309 is provided between the emergent surface of the scintillator 302 and the incident surface of the array of photosensors 303.

In order to reduce the thickness of the detector as much as possible, an angle θ between the bevel and the direction of the bundle of light-guide fibers is typically below 45 degrees. Devices used for the array of photosensors 303 can be Charge Coupled Devices (CCD), amorphous silicon photodiodes (TFD), etc., and will not be limited to a single line array or multiple line arrays and a specific number of channels.

The invention can achieve the following advantageous technical effects through provision of the bundle of light-guide fibers between the emergent surface of the scintillator and the incident surface of the array of photosensors.

1. The problem of damage to electronic circuits due to irradiation of X-rays is completely addressed, thereby avoiding irradiation damage from X-rays and achieving prolonged lifetime.

2. Since the photosensors are free from influence of X-rays, the detecting scope of the line array detector is expended, therefore it can be applied to X-ray measurement in a context of a large irradiation dose.

3. Direct irradiation of rays onto electronic devices is avoided, thereby reducing resultant electromagnetic interference and improving electromagnetic compatibility of the detector.

4. The use of the bundle of light-guide fibers ensures no occurrence of dispersion in a flickering image during transmission, which would result in both blurring of the image and a reduced spatial resolution of the image. Also, the use of the bundle of light-guide fibers accommodates to a trend that an area of an array of photosensors in a future detector will be further reduced.

5. The use of the lead-free bundle of light-guide fibers can both save the material cost and reduce harm of lead to the environment, which has a considerable significance of environment protection.

It shall be noted that for intuitive descriptions of a variance of each interlayer signal flow (X-rays, visual lights, analog signals, digital signals), there is an appropriate distance between respective layers in the structural diagrams of the invention, but in practice the respective layers engage each other closely. A semi-soft connection status shall be ensured between the scintillator, the bundle of light-guide fibers, and the receiving surface of the array of photosensors, so that there is a pressure which may be sufficient to ensure a tight connection but will not be too large and thus avoid damage to the devices.

The foregoing descriptions are illustrative in details of the X-ray line array detector provided according to the invention, and this specification sets forth the principle and embodiments of the invention by way of specific examples. The above descriptions of the embodiments are only intended to facilitate understanding the method and its essential ideal of the invention. Also, there are possible modifications made by those skilled in the art to the embodiments and their application scope. In summary, the disclosure in this specification shall not be taken as limitation of the invention.

The invention claimed is:

1. An X-ray line array detector, comprising an X-ray probe, the X-ray probe comprises a scintillator and an array of photosensors, wherein a bundle of light-guide fibers is provided between an emergent surface of the scintillator and an incident surface of the array of photosensors, and the bundle of light-guide fibers has at least one bend, or the incident direction and the emergent direction are not in a same line, wherein a shielding body is provided between the emergent surface of the scintillator and the incident surface of the array of photosensors, wherein the bundle of light-guide fibers is in a U shape, and wherein the U-shaped bundle of light-guide fibers is produced through winding light-guide fibers around the shielding body in layers and splitting the light-guide fibers and the shielding body along the winding direction of the light-guide fibers, and the light-guide fibers are bonded with each other and with the shielding body through composite glue.

2. The X-ray line array detector according to claim 1, wherein the shielding body is made of a metal material.

3. The X-ray line array detector according to claim 1, or 2, wherein the array of photosensors is consisted of a single line array or multiple lines array of photosensors.

4. The X-ray line array detector according to claim 1, or 2, wherein the array of photosensors is consisted of charge coupled devices or amorphous silicon photodiodes.

5. The X-ray line array detector according to claim 1, or 2, wherein the incident surface and the emergent surface of the bundle of light-guide fibers are bonded respectively with the emergent surface of the scintillator and the incident surface of the array of photosensors with a coupling agent.

* * * * *